(12) United States Patent
Tylutki et al.

(10) Patent No.: US 8,978,357 B2
(45) Date of Patent: Mar. 17, 2015

(54) SYSTEM AND METHOD FOR DETERMINING AN EXHAUST SYSTEM CONDITION

(75) Inventors: Vincent J. Tylutki, Livonia, MI (US); Janean E. Kowalkowski, Northville, MI (US); Benjamin Radke, Waterford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 540 days.

(21) Appl. No.: 13/309,287

(22) Filed: Dec. 1, 2011

(65) Prior Publication Data
US 2013/0139490 A1    Jun. 6, 2013

(51) Int. Cl.
| | |
|---|---|
| F01N 3/00 | (2006.01) |
| F01N 3/035 | (2006.01) |
| F01N 3/10 | (2006.01) |
| F01N 11/00 | (2006.01) |
| F01N 3/021 | (2006.01) |
| F01N 3/20 | (2006.01) |

(52) U.S. Cl.
CPC ............... *F01N 3/035* (2013.01); *Y02T 10/47* (2013.01); *F01N 3/10* (2013.01); *F01N 11/00* (2013.01); *F01N 3/021* (2013.01); *F01N 3/103* (2013.01); *F01N 3/2033* (2013.01); *F01N 3/2066* (2013.01); *F01N 11/002* (2013.01); *F01N 2560/06* (2013.01); *F01N 2560/14* (2013.01); *F01N 2610/03* (2013.01); *F01N 2900/1404* (2013.01); *F01N 2900/1621* (2013.01); *Y02T 10/26* (2013.01); *Y02T 10/24* (2013.01)
USPC .............................................. 60/276; 60/277

(58) Field of Classification Search
CPC ......... F01N 11/00; F01N 3/021; F01N 3/035; F01N 3/103; F01N 3/2033; F01N 3/2066; F01N 11/002; F01N 3/10
USPC .................................................... 60/276, 277
See application file for complete search history.

(56) References Cited

U.S. PATENT DOCUMENTS

2005/0150212 A1* 7/2005 Pfaeffle et al. .................. 60/286
2006/0225492 A1* 10/2006 Pfister ........................... 73/118.1
(Continued)

FOREIGN PATENT DOCUMENTS

DE    102005015998 A1    10/2006
DE    102010006728 A1    8/2010

OTHER PUBLICATIONS

English translation of German Patent Application Publication No. DE 10210006728 A1.*
German Office Action Report dated Feb. 26, 2014 for application 10 2012 221 632.4; pp. 1-7.

*Primary Examiner* — Jason Shanske
(74) *Attorney, Agent, or Firm* — Cantor Colburn LLP

(57) ABSTRACT

In one embodiment of the invention, a method for determining an exhaust system condition includes determining if a reaction in an oxidation catalyst is performing acceptably based on a determined temperature of the exhaust gas flowing from the oxidation catalyst and determining a temperature of the exhaust gas flowing from a particulate filter. The method further includes determining a temperature of the exhaust gas flowing into the oxidation catalyst, determining an exhaust system condition based on a first difference between the temperature of the exhaust gas flowing from the particulate filter and the temperature of the exhaust gas flowing from the oxidation catalyst and a second absolute difference between the temperature of the exhaust gas flowing from the oxidation catalyst and the temperature of the exhaust gas flowing into the oxidation catalyst and communicating a signal to identify the determined exhaust system condition.

14 Claims, 2 Drawing Sheets

(56) References Cited

U.S. PATENT DOCUMENTS

2008/0264037 A1* 10/2008 Takahashi et al. ............. 60/277
2009/0107114 A1* 4/2009 Ammineni et al. ............. 60/277
2010/0050608 A1 3/2010 Jayachandran et al.
2010/0154385 A1* 6/2010 Perrin et al. .................... 60/274
2010/0269489 A1* 10/2010 LaRose et al. ................. 60/285

* cited by examiner

SYSTEM AND METHOD FOR DETERMINING AN EXHAUST SYSTEM CONDITION

FIELD OF THE INVENTION

The subject invention relates to internal combustion engines and, more specifically, to methods and systems for determining the condition of exhaust systems of internal combustion engines.

BACKGROUND

An engine control module of an internal combustion engine controls the mixture of fuel and air supplied to combustion chambers within cylinders of the engine. After the air/fuel mixture is ignited, combustion takes place and the combustion gases exit the combustion chambers through exhaust valves. The combustion gases are directed by an exhaust manifold to a catalytic converter and/or other components of exhaust aftertreatment systems.

Manufacturers of internal combustion engines, particularly diesel engines, are presented with the challenging task of complying with current and future emission standards for the release of oxides of nitrogen, particularly nitrogen monoxide, as well as unburned and partially oxidized hydrocarbons, carbon monoxide, particulates and other combustion byproducts. In order to reduce the emissions of internal combustion engines, an exhaust aftertreatment system is used to meet emissions criteria for the exhaust gas.

Exhaust gas aftertreatment systems typically include one or more aftertreatment devices, such as particulate filters, oxidation catalysts, selective catalyst reduction devices, NOx traps, mixing elements and urea/hydrocarbon injectors. The temperature of the exhaust gas flowing in the system can affect the performance of some exhaust system components. For example, an oxidation catalyst may take a selected amount of time after the engine starts to reach its "light-off" or operating temperature. A particulate filter may rely directly on an oxidation catalyst generated exotherm to elevate and maintain exhaust gas temperature to a selected value at which regeneration (i.e., burning of particulates accumulated in the filter) takes place. Thus, the exhaust gas flowing from exhaust components upstream of the particulate filter can affect performance of the filter. Accordingly, if components are not performing efficiently, an indication of the specific cause of reduced performance may be useful in servicing the system. In some cases, information provided to the user or technician is not specific enough to allow for accurate determination of performance deficiencies during service.

SUMMARY OF THE INVENTION

In one exemplary embodiment of the invention, a method for determining an exhaust system condition includes determining if a reaction in an oxidation catalyst is performing acceptably based on a determined temperature of the exhaust gas flowing from the oxidation catalyst and determining a temperature of the exhaust gas flowing from a particulate filter. The method further includes determining a temperature of the exhaust gas flowing into the oxidation catalyst, determining an exhaust system condition based on a first difference between the temperature of the exhaust gas flowing from the particulate filter and the temperature of the exhaust gas flowing from the oxidation catalyst and a second difference between the temperature of the exhaust gas flowing from the oxidation catalyst and the temperature of the exhaust gas flowing into the oxidation catalyst, wherein the second difference is an absolute temperature difference, and communicating a signal to identify the determined exhaust system condition.

In another exemplary embodiment of the invention, an exhaust system including an oxidation catalyst and a particulate filter to receive exhaust gas from the oxidation catalyst. The system also includes a controller configured to determine an exhaust system condition based on a first difference between a temperature of the exhaust gas flowing from the particulate filter and a temperature of the exhaust gas flowing from the oxidation catalyst and a second difference between the temperature of the exhaust gas flowing from the oxidation catalyst and a temperature of the exhaust gas flowing into the oxidation catalyst and communicate a signal to identify the determined exhaust system condition, wherein the second difference is an absolute temperature difference.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
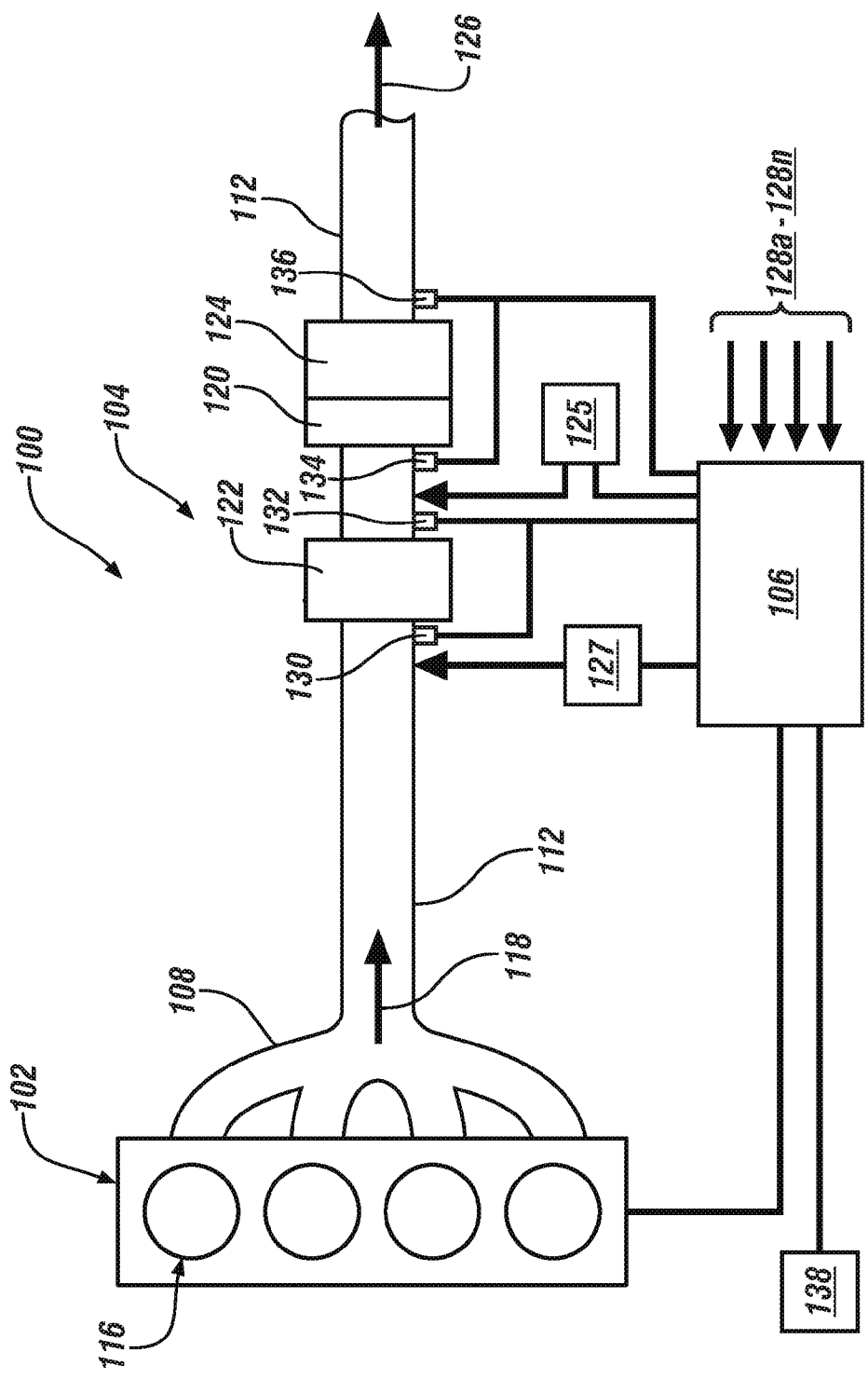
FIG. 1 illustrates an exemplary internal combustion engine including an exemplary exhaust aftertreatment system.

The following description is merely exemplary in nature and is not intended to limit the present disclosure, its application or uses. It should be understood that throughout the drawings, corresponding reference numerals indicate like or corresponding parts and features. As used herein, the terms controller and module refer to an application specific integrated circuit (ASIC), an electronic circuit, a processor (shared, dedicated, or group) and memory that executes one or more software or firmware programs, a combinational logic circuit, and/or other suitable components that provide the described functionality. In embodiments, a controller or control module may include one or more sub-controllers or sub-modules.

FIG. 1 is a schematic diagram of an embodiment of an engine system 100. The engine system 100 includes an internal combustion engine 102, an exhaust aftertreatment system 104 and an engine controller 106. The internal combustion engine 102 may be any suitable engine, such as a diesel or spark ignition engine. The exhaust aftertreatment system 104 includes an exhaust manifold 108 and an exhaust conduit 112. Cylinders 116 are located in the internal combustion engine 102, wherein the cylinders 116 receive a combination of combustion air and fuel. The combustion air/fuel mixture is combusted resulting in reciprocation of pistons (not shown) located in the cylinders 116. The reciprocation of the pistons rotates a crankshaft (not shown) to deliver motive power to a vehicle powertrain (not shown) or to a generator or other stationary recipient of such power (not shown) in the case of a stationary application of the internal combustion engine 102. The combustion of the air/fuel mixture causes a flow of exhaust gas 118 through the exhaust manifold 108, the exhaust conduit 112 and an oxidation catalyst 122, selective catalytic reduction device 120 and a particulate filter ("PF")

124. The exhaust aftertreatment system 104 reduces, oxidizes, traps or otherwise treats various regulated constituents of the exhaust gas 118, such as particulates, prior to its release to the atmosphere.

The oxidation catalyst ("OC") 122 may include, for example, a flow-through metal or ceramic monolith substrate that is wrapped in an intumescent mat or other suitable support that expands when heated, securing and insulating the substrate. The substrate may be packaged in a stainless steel shell or canister having an inlet and an outlet in fluid communication with exhaust gas conduit 112. The oxidation catalyst compound may be applied as a wash coat and may contain platinum group metals such as platinum (Pt), palladium (Pd), rhodium (Rh) or other suitable oxidizing catalysts. The selective catalytic reduction ("SCR") device 120 may include, for example, a flow-through ceramic or metal monolith substrate that is wrapped in an intumescent mat or other suitable support that expands when heated, securing and insulating the substrate. The substrate may be packaged in a stainless steel shell or canister having an inlet and an outlet in fluid communication with exhaust gas conduit 112. The substrate can include an SCR catalyst composition applied thereto. The SCR catalyst composition may contain a zeolite and one or more base metal components such as iron (Fe), cobalt (Co), copper (Cu) or vanadium (V) which can operate efficiently to convert NOx constituents in the exhaust gas 118 in the presence of a reductant such as ammonia (NH3). An NH3 reductant may be supplied from a fluid supply 125 (reductant supply) and may be injected into the exhaust gas 118 at a location upstream of the SCR device 120 using an injector. The reductant may be in the form of a gas, a liquid, or an aqueous urea solution and may be mixed with air in the injector to aid in the dispersion of the injected spray. A mixer may also be disposed within exhaust aftertreatment system to further assist in mixing of the reductant with the exhaust gas 118. In an embodiment, a second fluid supply, such as a hydrocarbon injector (HCI) 127, may be used to cause a temperature increase for the exhaust gas 118. Burning or oxidation of hydrocarbons from the HCI 127 in the OC device 122 causes an increase in exhaust gas temperature that may be used for a regeneration process. In an example, the OC device 122 may be used to combust hydrocarbon ("HC") from HCI 127 in an exothermic reaction that is effective to combust the accumulated particulates in the PF 124. Initiation of the PF 124 regeneration typically occurs at a selected light-off or operating temperature, wherein the exothermic reaction causes the exhaust gas temperature to attain the light-off temperature.

In an embodiment, the exhaust aftertreatment system 104 and fluid supplies 125, 127 are operationally coupled to and controlled by the engine controller 106 (also referred to as "controller" or "control module"). The engine controller 106 collects information regarding the operation of the internal combustion engine 102 from sensors 128a-128n, such as temperature (intake system, exhaust system, engine coolant, ambient, etc.), pressure, exhaust flow rates, particulate levels and NOx concentrations. The engine controller 106 may adjust the amount of NH3 reductant 125 or another suitable emission reducing fluid injected into the exhaust aftertreatment system 104. Further, the controller 106 may also be configured to perform selected processes or operations based on the sensed parameters, such as regeneration processes based on sensed particulate levels in the particulate filter 124. In an exemplary embodiment, the exhaust gas flow 118 is enters the oxidation catalyst device 122, which may be closely-coupled to the engine 102 in some embodiments to minimize heat loss and assist in emissions reduction. In an embodiment, an exothermic reaction occurs across the oxidation catalyst device 122, when excess hydrocarbon is injected wherein the reaction provides an increased temperature for exhaust gas received by the PF 124 for regeneration.

The PF 124 is disposed downstream of the OC device 122 and SCR device 120. The particulate filter 124 operates to filter the exhaust gas 118 of carbon and other particulates, including soot. In embodiments, the PF 124 may be constructed using a ceramic wall flow monolith filter that is wrapped in an insulating mat or other suitable support that secures and insulating the filter. The filter may be packaged in a shell or canister that is, for example, stainless steel, and that has an inlet and an outlet in fluid communication with exhaust gas conduit 112. The ceramic wall flow monolith filter may have a plurality of longitudinally extending passages that are defined by longitudinally extending walls. The passages include a subset of inlet passages that have and open inlet end and a closed outlet end, and a subset of outlet passages that have a closed inlet end and an open outlet end. Exhaust gas 118 entering the filter through the inlet ends of the inlet passages is forced to migrate through adjacent longitudinally extending walls to the outlet passages. It is through this exemplary wall flow mechanism that the exhaust gas 118 is filtered of carbon and other particulates. The filtered particulates are deposited on the longitudinally extending walls of the inlet passages and, over time, will have the effect of increasing the exhaust gas backpressure experienced by the internal combustion engine 102. It should be understood that the ceramic wall flow monolith filter is merely exemplary in nature and that the PF 124 may include other filter devices such as wound or packed fiber filters, open cell foams, sintered metal fibers, etc. In embodiments, the SCR device 120 and PF 124 may be located in the same canister. In other embodiments, the SCR device 120 may be placed in a separate canister upstream of the PF 124.

The accumulated particulate matter within the PF 124 is periodically cleaned, or regenerated to reduce exhaust system backpressure. Regeneration involves the oxidation or burning of the accumulated carbon and other particulates (also including soot) in what is typically a high temperature (e.g., at or above 600° C.) environment. In an embodiment, an elevated particulate level is sensed in the PF 124 by sensors 128a-128n in signal communication with controller 106 and regeneration may be performed. An exemplary regeneration process includes an introduction of excess thermal energy into the exhaust aftertreatment system 104 by introducing fuel (via HCI 127) into the exhaust gas 118 to oxidize within the OC device 122 thereby increasing the temperature of the exhaust gas 118 entering the PF 124. The exhaust gas 118 temperature and other exhaust parameters may be determined by any suitable method, including but not limited to, modeling and sensor measurements. For example, exhaust gas temperature measurements may be taken by a sensor 130 proximate the OC device 122 inlet, a sensor 132 proximate the OC device 122 outlet, a sensor 134 proximate the PF 124 inlet and a sensor 136 proximate the PF 124 outlet.

The sensors 130, 132, 134 and 136 are coupled to the controller 106 which receives the measurement signals and uses information, including the temperature data, to determine a condition of one or more exhaust system components. In an embodiment, the conditions are communicated, via a signal or other suitable means, to an indicator 138. The exemplary indicator 138 may be an indicator visible to a user or a service technician. In an embodiment, the service technician may connect to the system via a diagnostic device that receives the communication signal as a service code corresponding to the performance of specific engine components.

In an embodiment, the controller 106 provides an indication of an exhaust system condition that describes the performance of at least one of the HCI 127 or the OC device 122. Specifically, the system provides indication of the specific performance efficiencies and/or changes in performance of either HCI or oxidation catalyst, to simplify repair and improve customer service.

Figure 2:
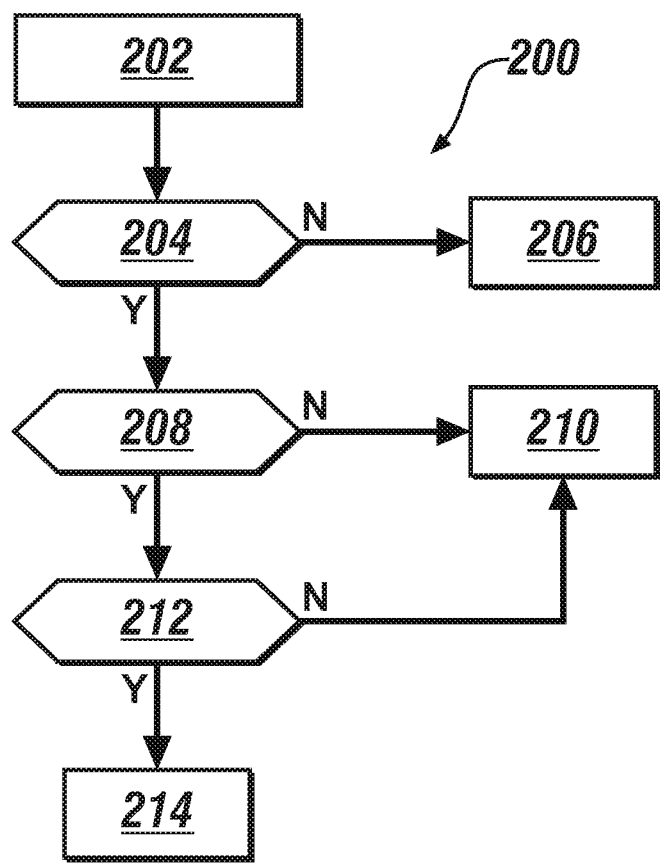
FIG. 2 is a diagram of an exemplary process for determining a condition of an exhaust aftertreatment system.

FIG. 2 is a flow chart 200 of exemplary steps of a process to determine an exhaust system condition. For ease of explanation, the exemplary steps will be discussed with reference to the exhaust aftertreatment system 104 shown in FIG. 1. It should be understood that the steps may be performed in any suitable sequence and are not limited to the illustrated chart. In a block 202, the exhaust system evaluation is initiated. The evaluation may be initiated based on a sensed parameter in the engine, a set time interval between periodic evaluations or any other suitable cause for evaluation. Specifically, the depicted evaluation is used to determine the condition of the HCI 127 and/or OC device 122. In block 204, a reaction in the OC device 122 is evaluated and/or analyzed to determine if the OC is performing acceptably by comparing a measured and/or calculated value to a selected threshold. The evaluation of the OC may be performed by any suitable technique, such as using measurements, modeling and/or data analysis. In an embodiment, the following equation is used to assess OC performance via an efficiency ratio:

$$\text{Efficiency ratio} = \frac{\int (T_{DS} - T_{NoEx}) \cdot dt}{\int (T_{Mod} - T_{NoEx}) \cdot dt}$$

where $T_{DS}$=temperature downstream of the OC;

$T_{NoEx}$=temperature downstream of the OC without an exothermic reaction, such as when the OC is failed (determined by testing and/or modeling); and $T_{Mod}$=temperature downstream of the OC with a correct exothermic reaction in the OC (determined by testing and/or modeling).

In an embodiment, $T_{DS}$ is the exhaust gas 118 temperature downstream of the OC device 122 determined by the sensor 132 and/or sensor 134. The $T_{Mod}$ and $T_{NoEx}$ values may be determined by any suitable method, such as by testing and/or modeling the exhaust system with the selected conditions and configuration. In one example, an efficiency ratio (also called "efficiency value") of about 1 indicates an acceptably performing and functional OC device 122 and HCI 127. In block 204, the efficiency ratio is compared to a predetermined threshold to determine a level of OC device 122 and/or HCI 127 component performance. An efficiency ratio value less than the threshold indicates a reduced efficiency for one or more components, whereas a value greater than the threshold indicates that the exhaust components are performing acceptably. For example, a threshold value for acceptable component performance may be about 0.5. In another embodiment, the threshold value may be about 0.2. If the efficiency ratio value is compared to the threshold and indicates the performance is acceptable, the process moves to block 206 where the engine continues normal operation because the exhaust components have passed the assessment.

If the efficiency ratio value, as compared to the threshold, indicates the exhaust system performance is exhibiting reduce efficiency, the process advances to block 208 where further evaluation and analysis occurs. In block 208 determined parameters, modeling and/or algorithms may be used to further determine component operation. For example, a difference between exhaust gas temperature at the PF 124 outlet and the OC device 122 outlet is compared to a first threshold value. In an embodiment, the temperature of the exhaust gas flowing from the PF 124 is determined by sensor 136 and the temperature of the exhaust gas flowing from the OC device 122 is determined by sensor 132 and/or sensor 134. The difference is compared to the first threshold value, wherein a difference greater than the threshold provides a "Yes" indicator and a difference less than the threshold provides a "No" indicator. The "No" determination advances the process to block 210, while the "Yes" determination advances the process to block 212. Block 210 provides an indication that the HCI 127 efficiency is in question. In an embodiment, the indication of the exhaust system condition is provided by a signal from the controller 106 to the user and/or service technician (e.g., to indicator 138). In an embodiment, the first threshold value is about 70 to about 130 degrees Celsius. In another embodiment, the first threshold value is about 100 degrees Celsius.

In the case of a "Yes" determination in block 208, block 212 determines a delta or absolute change in temperatures (i.e., absolute value of the difference between temperatures, "differential" or "absolute difference") between exhaust gas temperature at the inlet and outlet of the OC device 122 and compares the delta to a second threshold value. As discussed, absolute difference or delta is the variation in a selected variable. In an embodiment, the temperature of the exhaust gas flowing into the OC device 122 is determined by sensor 130 and the temperature of the exhaust gas flowing from the OC device 122 is determined by sensor 132 and/or sensor 134. The delta value is compared to the second threshold value, wherein a delta less than the second threshold provides a "Yes" indicator and a delta greater than the threshold provides a "No" indicator. The "No" determination advances the process to block 210 for an indication of HCI investigation by the operator or service technician, while the "Yes" determination advances the process to block 214. In block 214, the process indicates that the OC device 122 has reduced efficiency and may need repair or replacement. The indication of the OC device 122 efficiency reduction may be provided by a signal from the controller 106 to the user and/or service technician, such as via the indicator 138. In an embodiment, the second threshold value is about 70 to about 130 degrees Celsius. In another embodiment, the second threshold value is about 100 degrees Celsius.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method for determining an exhaust system condition, the method comprising:

determining, by a controller configured to control the exhaust system of a vehicle, if a reaction in an oxidation catalyst is performing acceptably based on a difference between a determined temperature of the exhaust gas flowing from the oxidation catalyst and a temperature of the exhaust gas flowing from the oxidation catalyst when not properly functioning and a difference between a temperature of the exhaust gas flowing from the oxidation catalyst when properly functioning and the temperature of the exhaust gas flowing from the oxidation catalyst when not properly functioning;

determining a temperature of the exhaust gas flowing from a particulate filter downstream of the oxidation catalyst;

determining a temperature of the exhaust gas flowing into the oxidation catalyst;

determining a temperature of the exhaust gas flowing from the oxidation catalyst;

determining an exhaust system condition based on a first difference between the temperature of the exhaust gas flowing from the particulate filter and the temperature of the exhaust gas flowing from the oxidation catalyst and a second difference between the temperature of the exhaust gas flowing from the oxidation catalyst and the temperature of the exhaust gas flowing into the oxidation catalyst, wherein the second difference is an absolute temperature difference;

communicating a signal to identify the determined exhaust system condition; and connecting a diagnostic device to the vehicle for receiving the signal as a service code.

2. The method of claim 1, wherein determining if the reaction in the oxidation catalyst is performing acceptably comprises comparing modeled temperatures of the exhaust gas flowing from the oxidation catalyst and the determined temperature of the exhaust gas flowing from the oxidation catalyst to determine an efficiency value which is compared to a first threshold to determine reaction performance.

3. The method of claim 1, wherein determining the temperatures of the exhaust gas flowing from the particulate filter and the oxidation catalyst comprises measuring the temperatures via sensors.

4. The method of claim 1, wherein the exhaust system condition comprises at least one of an efficiency reduction of the oxidation catalyst and an efficiency reduction of a hydrocarbon injector.

5. The method of claim 1, wherein determining the exhaust system condition comprises comparing the first difference to a second threshold and comparing the second difference to a third threshold.

6. The method of claim 5, wherein the oxidation catalyst has an efficiency reduction if the first difference is greater than the second threshold and the second difference is less than the third threshold.

7. The method of claim 5, wherein the second threshold and the third threshold are a same temperature value.

8. An exhaust system, comprising:
an oxidation catalyst;
a particulate filter to receive exhaust gas from the oxidation catalyst; and
a controller configured to determine an exhaust system condition based on a first difference between a temperature of the exhaust gas flowing from the particulate filter and a temperature of the exhaust gas flowing from the oxidation catalyst and a second difference between the temperature of the exhaust gas flowing from the oxidation catalyst and a temperature of the exhaust gas flowing into the oxidation catalyst, and the controller is also configured to communicate a signal to identify the determined exhaust system condition, wherein the second difference is an absolute temperature difference, wherein the exhaust system condition comprises one of an efficiency reduction of the oxidation catalyst and an efficiency reduction of a hydrocarbon injector, wherein the exhaust system condition is determined by comparing the first difference to a second threshold and comparing the second difference to a third threshold, wherein the oxidation catalyst has an efficiency reduction if the first difference is greater than the second threshold and the second difference is less than the third threshold.

9. The system of claim 8, wherein the controller is configured to determine acceptable or unacceptable performance of a reaction in the oxidation catalyst based on a comparison of an efficiency value to a first threshold.

10. The system of claim 9, wherein the controller determines the efficiency value based on the temperature of the exhaust gas flowing from the oxidation catalyst, a temperature of the exhaust gas flowing from the oxidation catalyst when properly functioning and a temperature of the exhaust gas flowing from the oxidation catalyst when not properly functioning.

11. The system of claim 9, wherein the unacceptable performance is caused by an efficiency reduction of at least one of the oxidation catalyst or a hydrocarbon injector.

12. The system of claim 8, wherein the temperatures of the exhaust gas flowing from the particulate filter and the oxidation catalyst are measured by sensors.

13. The system of claim 8, wherein the second threshold and the third threshold are a same temperature value.

14. An internal combustion engine system, comprising:
an oxidation catalyst;
a hydrocarbon injector upstream of the oxidation catalyst;
a particulate filter to receive exhaust gas from the oxidation catalyst;
a sensor configured to determine a temperature of the exhaust gas flowing into the oxidation catalyst;
a sensor configured to determine a temperature of the exhaust gas flowing from the particulate filter;
a sensor configured to determine a temperature of the exhaust gas flowing from the oxidation catalyst; and
a controller configured to determine an exhaust system condition based on a first difference between a temperature of the exhaust gas flowing from the particulate filter and a temperature of the exhaust gas flowing from the oxidation catalyst and a second absolute difference between the temperature of the exhaust gas flowing from the oxidation catalyst and a temperature of the exhaust gas flowing into the oxidation catalyst and communicate a signal to identify the determined condition of the oxidation catalyst, wherein the exhaust system condition comprises one of an efficiency reduction of the oxidation catalyst and an efficiency reduction of the hydrocarbon injector, wherein the exhaust system condition is determined by comparing the first difference to a first threshold and comparing the second absolute difference to a second threshold, wherein the oxidation catalyst has an efficiency reduction if the first difference is greater than the first threshold and the second absolute difference is less than the second threshold.

* * * * *